US009169963B1

(12) United States Patent
Chen et al.

(10) Patent No.: US 9,169,963 B1
(45) Date of Patent: Oct. 27, 2015

(54) STAND DEVICE

(71) Applicant: UNIFORM INDUSTRIAL CORP., New Taipei (TW)

(72) Inventors: Yu-Tsung Chen, New Taipei (TW); Tsung-Chi Hung, New Taipei (TW); Yu-Shih Chin, New Taipei (TW)

(73) Assignee: UNIFORM INDUSTRIAL CORP., New Taipei (TW)

( * ) Notice: Subject to any disclaimer, the term of this patent is extended or adjusted under 35 U.S.C. 154(b) by 0 days.

(21) Appl. No.: 14/533,484

(22) Filed: Nov. 5, 2014

(30) Foreign Application Priority Data

Aug. 18, 2014 (TW) .............................. 103214753 U

(51) Int. Cl.
| *A47G 29/00* | (2006.01) |
| *F16M 11/20* | (2006.01) |
| *F16M 11/22* | (2006.01) |
| *F16M 11/06* | (2006.01) |
| *F16M 11/12* | (2006.01) |
| *F16M 11/04* | (2006.01) |

(52) U.S. Cl.
CPC ........... *F16M 11/2035* (2013.01); *F16M 11/04* (2013.01); *F16M 11/06* (2013.01); *F16M 11/12* (2013.01); *F16M 11/22* (2013.01)

(58) Field of Classification Search
CPC ....... F16M 11/06; F16M 11/12; F16M 11/10; F16M 11/04; F16M 11/2021; F16M 2200/041; F16M 11/2035; F16M 11/22

USPC ........ 248/372.1, 371, 121, 133, 176.1, 176.3, 248/398

See application file for complete search history.

(56) References Cited

U.S. PATENT DOCUMENTS

| 7,490,807 B2* | 2/2009 | Souza et al. ................ 248/372.1 |
| 8,087,625 B2* | 1/2012 | Chang ......................... 248/205.5 |
| 8,876,074 B2* | 11/2014 | Chen ........................... 248/284.1 |
| 2008/0099653 A1* | 5/2008 | Chiang et al. ................. 248/500 |
| 2012/0043447 A1* | 2/2012 | Franczyk et al. ............. 248/393 |

* cited by examiner

*Primary Examiner* — Todd M Epps
(74) *Attorney, Agent, or Firm* — Muncy, Geissler, Olds & Lowe, P.C.

(57) ABSTRACT

A stand device includes a pedestal having a base and a cap, a support, and a pulling member, wherein a receiving space is formed between the base and the cap. The support includes a connecting member and a positioning member. The connecting member includes a contact portion and a connect portion extended from the contact portion, and the contact portion is disposed at an outer surface of the cap. The positioning member includes a restraining portion and a fixing portion extended from the restraining portion and passing through an opening of the cap for connecting to the connecting member, and the restraining portion is disposed at an inner surface of the cap. When the support is rotated around the pedestal, the fixing portion is moved within the opening, and when the fixing portion is moved against the edge of the opening, the support may be restrained rotating around the pedestal.

10 Claims, 7 Drawing Sheets

STAND DEVICE

CROSS-REFERENCES TO RELATED APPLICATIONS

This non-provisional application claims priority under 35 U.S.C. §119(a) on Patent Application No. 103214753 filed in Taiwan, R.O.C. on 2014/08/18, the entire contents of which are hereby incorporated by reference.

BACKGROUND

1. Technical Field

The present invention relates to a stand device, especially to a stand device for a camera.

2. Related Art

As the technology has developed, camera image dot per inch (DPI) continues to rise, and the angle of view is becoming wider. Accordingly, when the camera is adapted to a wall, a stand device is required to fix the camera on the wall. If the camera device is high quality, the stand device should also be high quality, to better support the camera device, so as to enable better image capturing. A traditional stand device for a camera uses a rotating shaft and a pivot to move rotationally and fix a position. However, when the moving angle is very small, it is very easy to lose the accuracy of the fixed position for capturing the image, because gravity may cause movement when the mounting of the camera to the stand device is not fixed immediately after adjusting. In addition, the traditional stand device requires a user to lock the camera onto the base of the stand device, which the user may feel is inconvenient.

It is therefore necessary to have an improved stand device for the users to have an accuracy fix position quickly without sliding when mounting the camera onto the stand device. Accordingly, the ordinary skilled person in this field would like to improve the mounting's accuracy fix position problem.

SUMMARY

In view of the above problem, the present invention provides a stand device, which includes a pedestal, a support and a pulling member. The pedestal includes a base and a cap engaged with the base, wherein a receiving space is formed between the base and the cap. The cap includes an opening. The support is connected to the pedestal, and the support includes a connecting member and a positioning member. The connecting member includes a contact portion and a connect portion extended from the contact portion, and the contact portion is disposed at an outer surface of the cap. The positioning member includes a restraining portion and a fixing portion extended from the restraining portion and passing through the opening for connecting to the connecting member, and the restraining portion is disposed at an inner surface of the cap. When the support is rotated around the pedestal, the fixing portion is moved within the opening, and when the fixing portion is moved against the edge of the opening, the support may be restrained rotating around the pedestal. The pulling member includes two ends, one end connected to the base and the other end connected to the positioning member, so as to pull the support toward to the base.

The stand device of the present invention can provide a better performance and convenient to the user comparing to the traditional stand device. It omits the second screwing of the camera device to the stand device after setting the imaging angle of the camera device. In addition, due to the pulling force from the pulling member and the friction of the friction member offset the influences from the gravity of the camera device and the vibration of outside environment, the camera device may be firmly set with an accuracy small angle without sliding. Consequently, the imaging may be set more accuracy.

Detailed description of the characteristics and the advantages of the present invention are shown in the following embodiments. The technical content and the implementation of the present invention should be readily apparent to any person skilled in the art from the detailed description, and the purposes and the advantages of the present invention should be readily understood by any person skilled in the art with reference to content, claims and drawings in the disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
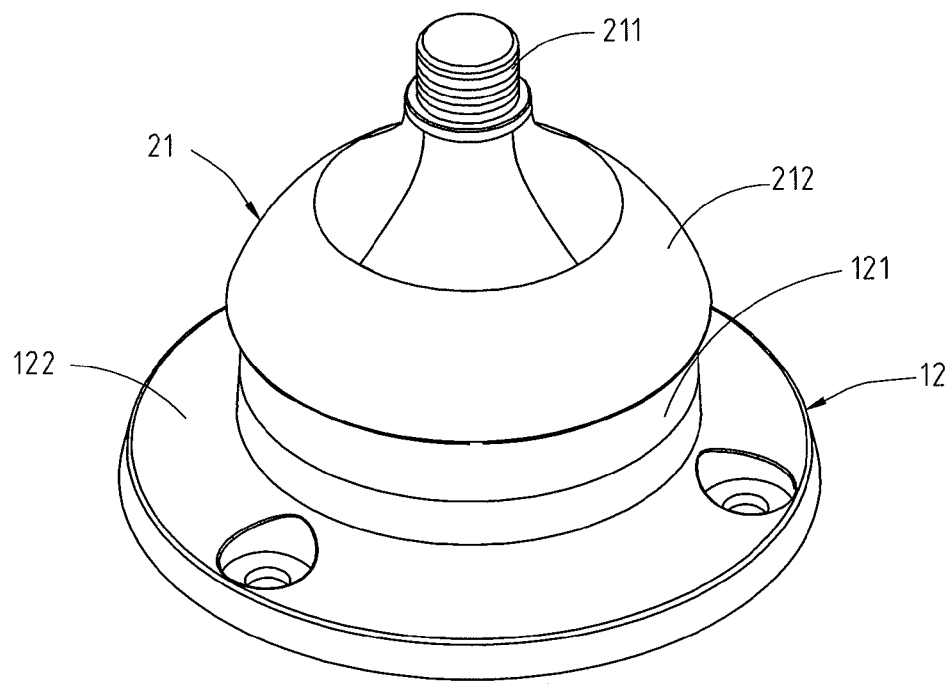
FIG. 1 is a perspective view of a stand device according to one embodiment of the present invention.
Figure 2:
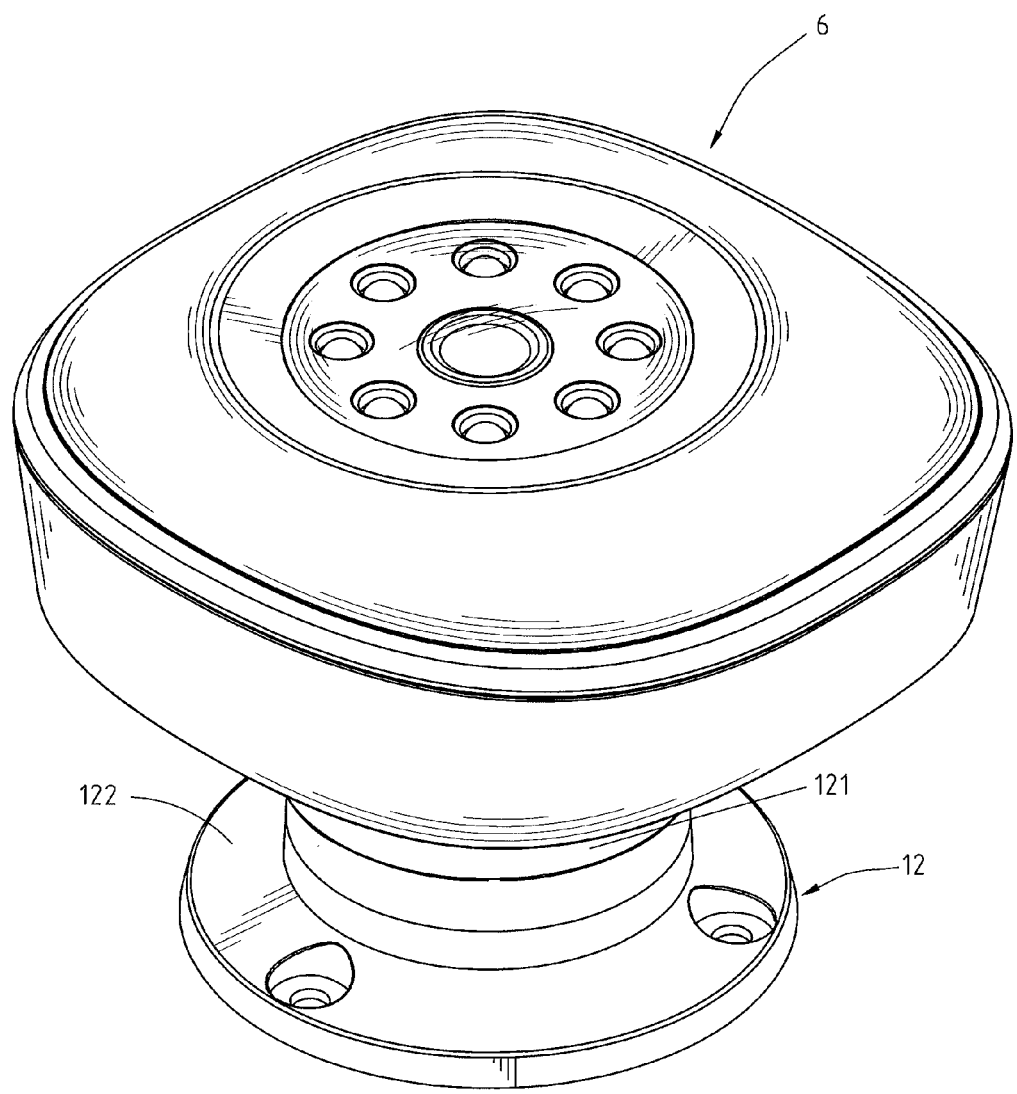
FIG. 2 is schematic diagram of the stand device in use according to one embodiment of the present invention.
Figure 3:
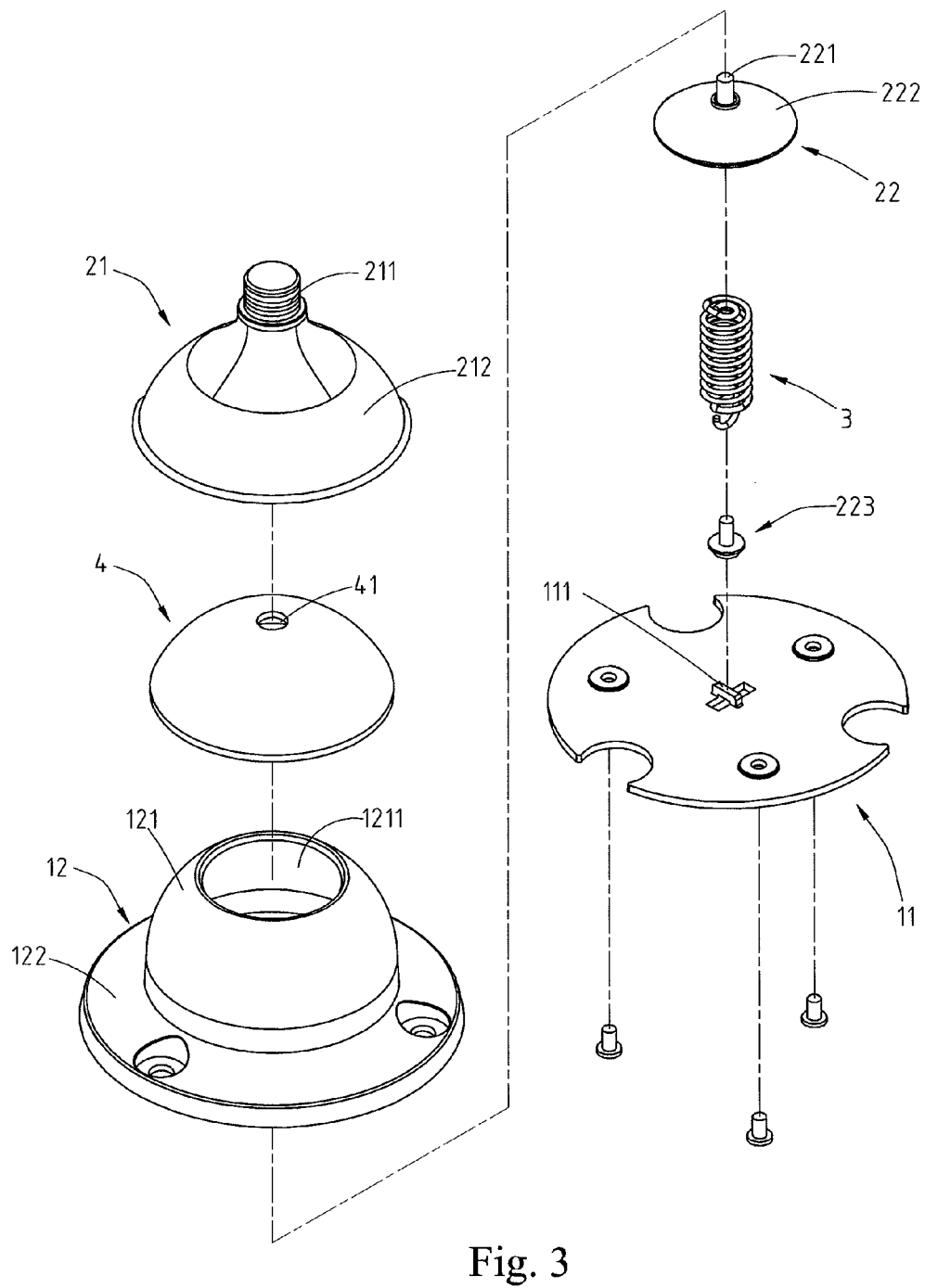
FIG. 3 is an exploded view of the stand device according to one embodiment of the present invention.

Please refer to FIG. 1 to FIG. 4, which illustrate an embodiment of a stand device according to the present invention with perspective view, a schematic diagram when in use, an exploded view, and a cross-sectional view respectively. The stand device according to the present embodiment comprises a pedestal 1, a support 2, and a pulling member 3; details will follow below.

Pedestal 1 comprises a base 11 and a cap 12. The base 11 is an approximate circular plate, and a joint member 111 is disposed adequately on the base for coupling to an end of the pulling member 3. The cap 12 is an approximate hemisphere, and a bottom of the cap is an opening with a brim 122 extending along the periphery thereof for covering the periphery of the base 11, so as to define a receiving space used for the pulling member 3 to move therein. Additionally, the cap 12 comprises a cambered surface 121, and the top of the cambered surface 121 comprises a circular opening 1211. The size of the opening 1211 may allow the support 2 rotating around the pedestal 1. When the support 2 is rotating around the pedestal 1, the opening 1211 may avoid damage caused by the bottom edge of the support 2 being contacted with the pedestal 1.

In the previous description, the joint member 111 is preferably disposed on the central of the upper surface of the base 11. Preferably, the base 11 and the joint member 111 are made from metal, however, the material is not used to limit the present invention. In addition, the brim 122 of the cap 12 may cover the base 11, so the shape of the brim 122 of the cap 12 is corresponded to the base 11. In the present embodiment, both the brim 122 of the cap 12 and the base 11 are approximately a circle, but the shape is not limited to the embodiment. Additionally, the cap 12 may be preferably made from metal, which is not used to limit the present invention.

The support 2 comprises a connecting member 21 and a positioning member 22. The support 2 is connected onto the pedestal 1 pulled by the pulling member 3, and the details will be described in below.

The connecting member 21 comprises a connect portion 211 and a contact portion 212, wherein the connect portion 211 is in the shape of cylindrical. The connect portion 211 is disposed at a top central of the contact portion 212 so as to engage with the camera device 6. The contact portion 212 is in the shape of hemisphere and extending from the bottom of the connect portion 211. When the support 2 is assembled onto the pedestal 1, the pulling member 3 pulls the support 2, and the contact portion 212 is located at an outer surface of the cambered surface 121 of the cap 12. The size of the contact portion 212 is larger than the area of the opening 1211 so as to avoid the connecting member 21 falling out from the opening 1211.

As described previously for the camera device mounting to the support, the connect portion 211 preferably has a screw thread however, this is not used to limit the present invention. Further, in a preferred embodiment the connecting member 21 is metal, but is not limited to metal only.

The positioning member 22 comprises a fixing portion 221 and a restraining portion 222, wherein the fixing portion 221 is cylindrical in shape. The fixing portion 221 is located at the top central of the restraining portion 222, passing through the opening 1211, and engaging with the connecting member 21. The restraining portion 222 is in the shape of hemisphere extending from the bottom of the fixing portion 221. The restraining portion 222 is disposed at an inner side of the cambered surface 121 of the cap 12; that is, the restraining portion 222 is located at the receiving space formed by the base 11 and the cap 12. In addition, an embedded part 224 is disposed on the restraining portion 222. A cross-sectional view of the embedded part 224 is a U-shaped recess hole, which is used for receiving a T-shaped engaging part 223, wherein the engaging part 223 is located into the embedded part 224 by passing through the center of the pulling member 3. Thus, the engaging part 223 may fix one end of the pulling member 3 into the embedded part 224 of the positioning member 22 and avoid the pulling member 3 damaged by rotating abrasion. Additionally, the bottom area of the restraining portion 222 of the positioning member 22 is larger than the area of the opening 1211, so the positioning member 22 may be avoided falling out of the opening 1211. The pulling member 3 may be avoided losing performance or getting damaged because the fixing portion 221 may be avoided falling out of the cap 12.

The fixing portion 221 preferably has a screw thread (not shown), for screwing the fixing portion 221 with the connecting member 21, which however, is not used to limit the present invention. The engaging part 223 may comprise a screw thread (not shown), and the corresponding embedded part 224 may also comprise a screw thread (not shown), so the engaging part 223 may screw the pulling member 3 onto the embedded part 224. Accordingly, the engaging part 223 is preferably made from metal, alternatively from plastic, and the positioning member 22 is preferably made from metal, which however, are not used to limit the present invention.

The pulling member 3 comprises two ends. One end of the pulling member 3 is connected to the base 11 and engaged within the embedded part 224, and the other end of the pulling member 3 is connected to the embedded part 224 of the positioning member 22. Accordingly, the support 2 may be pulled toward to the base 11, so the support 2 and the pedestal 1 may be connected firmly with each other. Additionally, the pulling member 3 may be made from elastic material, preferably made from a spring, but is not used to limit the present invention.

Figure 4:
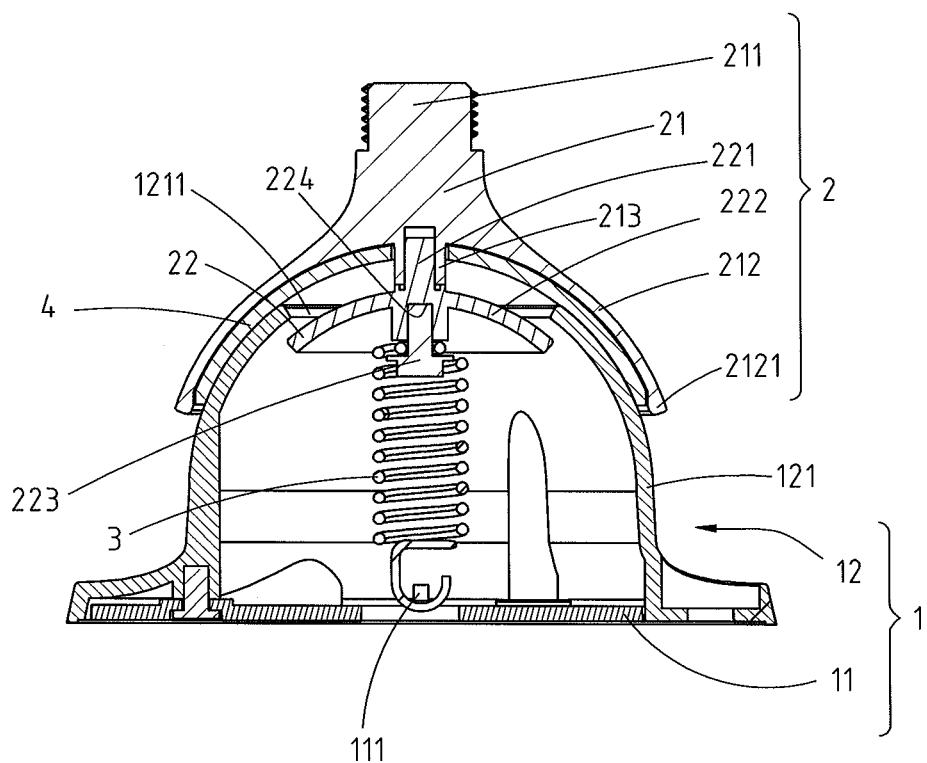
FIG. 4 is a cross-sectional view of the stand device according to one embodiment of the present invention.

In addition, the stand device of the present embodiment further comprises a friction member 4 disposed between the support 2 and the pedestal 1. The friction member 4 is in the shape of hemisphere. A through hole 41 is disposed adequately on the surface of the friction member 4, so a connecting part 213 of the connecting member 21 may pass through the through hole 41 and connect to the fixing portion 221, as shown in FIG. 4.

The connecting part 213 is disposed substantially at the center of the contact portion 212. A hollowed boss of the connecting part 213 is extended toward to the pedestal 1, and shaping with U-shape in the cross-sectional view. The connecting part 213 is engaged with the fixing portion 221, so the connecting member 21 of the connecting part 213 may pass through the through hole 41 of the friction member 4 and connect to the fixing portion 221. Accordingly, the positioning member 22 and the connecting member 21 are firmly engaged with each other. Thus, the size and the position of the through hole 41 of the friction member 4 may be various in accordance with the fixing portion 221 or the connecting part 213 of the connecting member 21.

The friction member 4 is attached to the inner surface of the contact portion 212. The bottom edge of the contact portion 212 further comprises a protruding rim 2121 for stopping the friction member 4. Accordingly, the friction member 4 may be positioned to avoid falling out of the contact portion 212, and instead maintain its performance and appearance. Additionally, when the support 2 is assembled onto the pedestal 1, the pulling member 3 may force the friction member 4 toward the cambered surface 121 of the cap 12. Consequently, the friction member 4 may be attached to the cambered surface 121 and provide friction for the support 2 and the pedestal 1 to avoid the support 2 sliding relative to the pedestal 1. As a result, the support 2 may be firmly set on the angle as the user desire. Additionally, the size of the friction member 4 is larger than the area of the opening 1211, so the friction member 4 may be avoided to be falling into the opening 1211.

In the previous description, the friction member 4 is preferably made from rubber material or other material having a larger friction coefficient, so as to provide friction between the support 2 and the pedestal 1; however, the material disclosed above is not used to limit the present invention.

Figure 5:
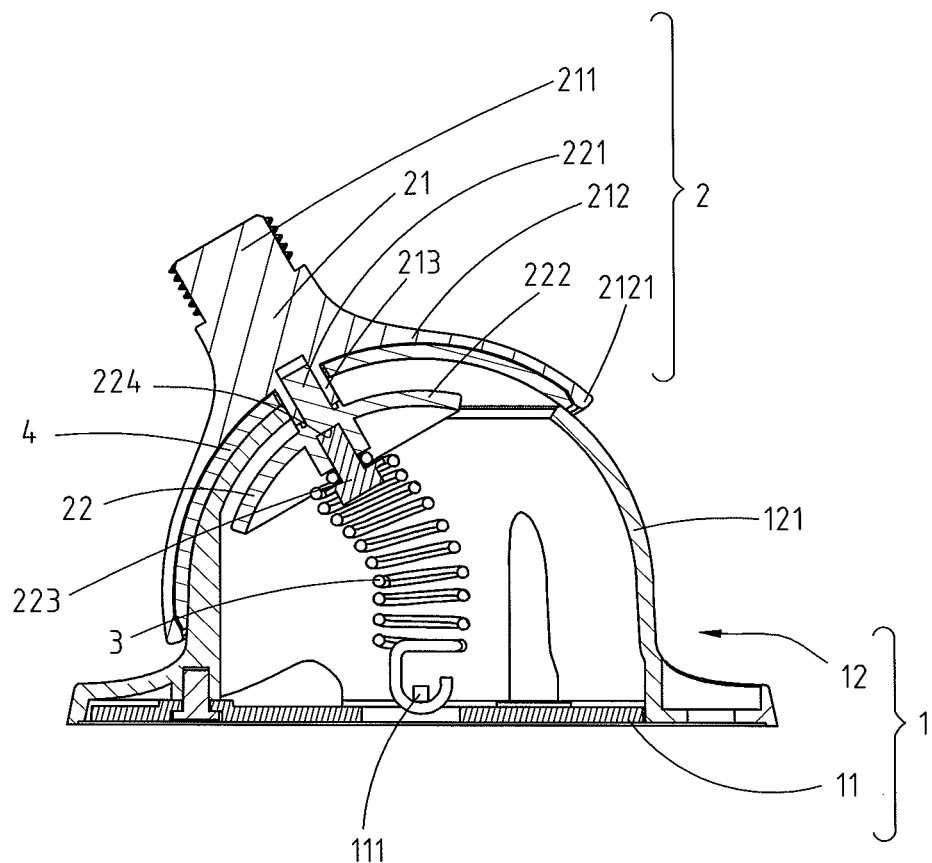
FIG. 5 is a cross-sectional view of the stand device when rotating according to one embodiment of the present invention.

Please refer to FIG. 5, which shows a cross-sectional view of the use status. The biggest rotating range is the range that the fixing portion 221 move around the edge of the opening 1211. Thus, when the opening 1211 is provided with adequately size, the biggest rotating range can be set. The edge of the contact portion 212 will not contact the pedestal 1 when moving at the biggest rotating range, so as to avoid the contact portion 212 or the pedestal 1 causing damaged.

Figure 6:
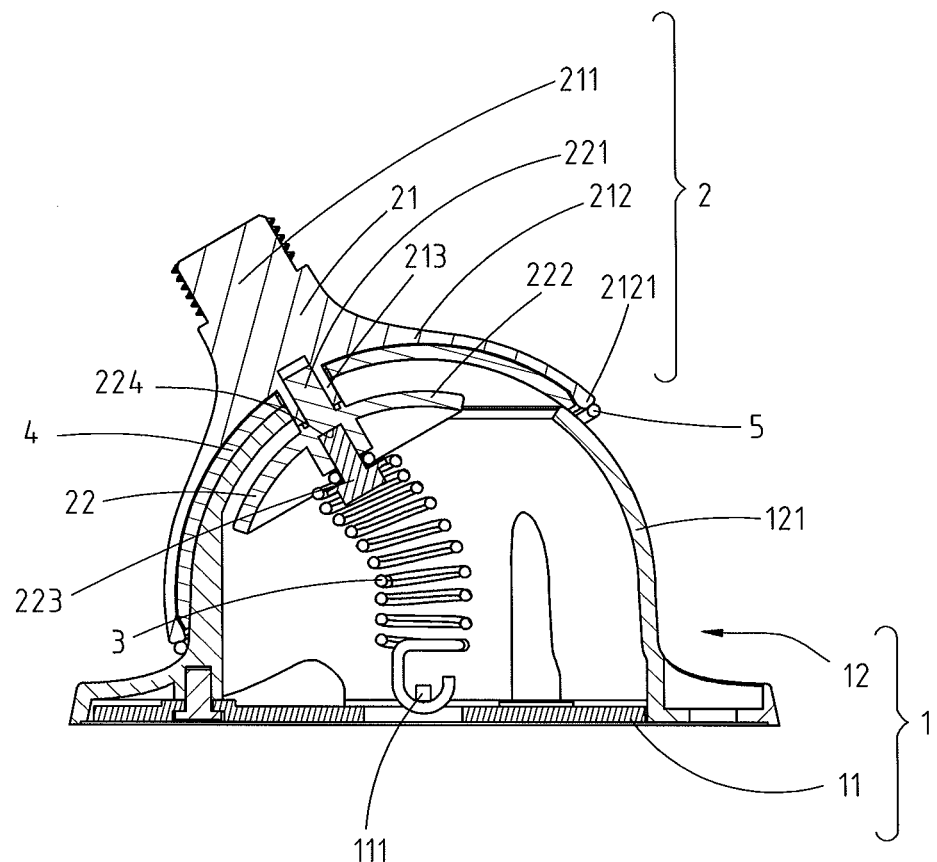
FIG. 6 is a cross-sectional view of the stand device when rotating according to another embodiment of the present invention.

In another embodiment, as shown in FIG. 6, in order to avoid the edge of the contact portion 212 getting damaged by contact with the pedestal 1 when moving at the biggest rotating range, a buffer member 5 is provided at the protruding rim 2121 of the contact portion 212. Preferably, the buffer member 5 is made from foam material or other similar material that can provide a buffer effect; however, the disclosure is not used to limit the present invention.

Figure 7:
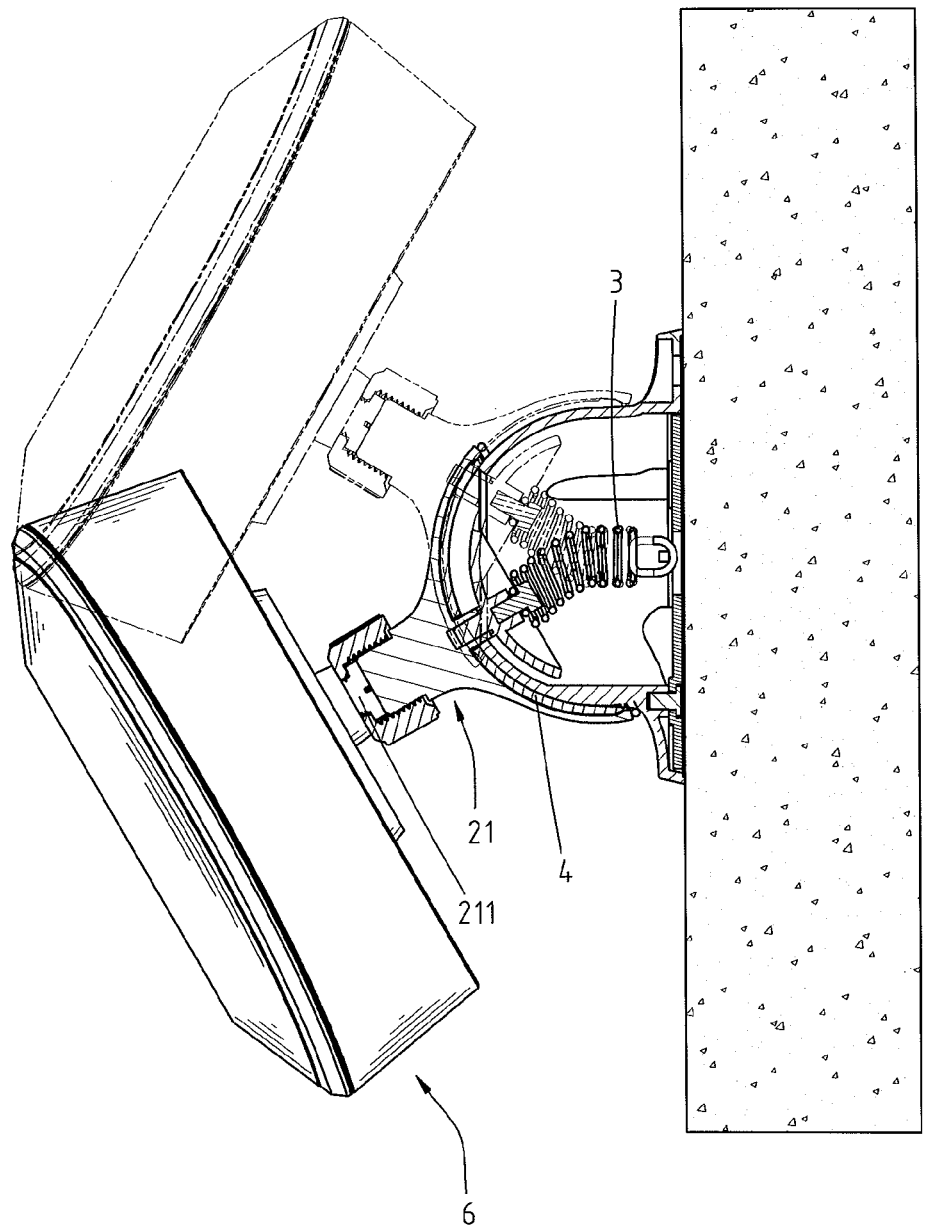
FIG. 7 is a cross-sectional view of the stand device when mounting on a wall and in use according to one embodiment of the present invention.

Please refer to FIG. 7, which shows the use status of the stand device with a partial cross-sectional view. The camera device 6 may be mounted on a wall by using the stand device of the present invention, so the user may adjust the camera device to a desired angle. Due to the pulling force from the pulling member 3 and the friction of the friction member 4 offseting the gravitational influence of the camera device and the vibrations of the outside environment, the camera device 6 may be firmly set with an accuracy small angle without sliding. The wall for mounting camera device 6 may be changed to a ceiling or to a table, which are not used to limit the present invention.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A stand device, comprising:
    a pedestal, comprising a base and a cap engaged with the base, wherein a receiving space is formed between the base and the cap, the cap comprising an opening:
    a support connected to the pedestal, wherein the support comprises:
        a connecting member comprising a contact portion and a connect portion extended from the contact portion, and the contact portion disposed at an outer surface of the cap; and
        a positioning member comprising a restraining portion and a fixing portion extended from the restraining portion and passing through the opening for connecting to the connecting member, and the restraining portion disposed at an inner surface of the cap; when the support is rotated around the pedestal, the fixing portion is moved within the opening, and when the fixing portion is moved against an edge of the opening, the support may be restrained rotating around the pedestal; and
    a pulling member comprising two ends, one end connected to the base and the other end connected to the positioning member, so as to pull the support toward to the base.

2. The stand device of claim 1, wherein the base comprises a joint member, and the end of the pulling member connected to the base is connected to the joint member of the base.

3. The stand device of claim 1, wherein the positioning member further comprises an engaging part, and the end of the pulling member connected to the positioning member is connected to the engaging part of the pulling member.

4. The stand device of claim 3, wherein the positioning member further comprises an embedded part for engaging with the engaging part.

5. The stand device of claim 1, wherein the cap comprises a cambered surface, and the contact portion and the restraining portion are disposed on an outer surface and an inner surface of the cambered surface respectively.

6. The stand device of claim 5, wherein the opening is located within the cambered surface.

7. The stand device of claim 1, wherein a size of the contact portion and size of the restraining portion are larger than an area of the opening respectively.

8. The stand device of claim 1, wherein the support further comprises a friction member located at an inner surface of the contact portion and attached to the outer surface of the cap.

9. The stand device of claim 8, wherein the contact portion comprises a protruding rim disposed against an edge of the friction member.

10. The stand device of claim 1, wherein the support further comprises a buffer member located at an edge of the contact portion.

* * * * *